3,176,043
DERIVATIVES OF ACTINOSPECTACIN
Herman Hoeksema, Kalamazoo, and Paul F. Wiley, Texas Township, Kalamazoo County, Mich., assignors to The Upjohn Company, Kalamazoo, Mich., a corporation of Delaware
No Drawing. Filed Sept. 5, 1962, Ser. No. 221,435
9 Claims. (Cl. 260—552)

This invention relates to novel compositions of matter and to a process for the preparation thereof, and is particularly directed to novel reaction products of thiosemicarbazide and actinospectacin and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961, Union of South Africa Patent No. 60/4,098 and Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was $C_{14}H_{26}N_2O_7$, but it has since been shown that the molecular formula is $C_{14}H_{24}N_2O_7$.

It has now been found that novel compounds according to this invention are obtained by reacting actinospectacin with thiosemicarbazide. For example, on reacting actinospectacin with thiosemicarbazide, there are obtained 4-hydroxy-2-oxovaleraldehyde bis(thiosemicarbazone) and a compound designated herein as actinospectacin thiosemicarbazone.

Alternatively, 4-hydroxy-2-oxovaleraldehyde bis(thiosemicarbazone) can be obtained by reacting actinospectinoic acid with thiosemicarbazide. For example, on reacting actinospectinoic acid with thiosemicarbazide dissolved in 2 N HCl there is obtained 4-hydroxy-2-oxovaleraldehyde bis(thiosemicarbazone). Actinospectinoic acid is obtained by the action of an alkali on actinospectacin. By this procedure the actinospectacin molecule is cleaved, yielding a new compound, tetrahydro-3-hydroxy-5-methyl-2-[2,4,6-trihydroxy-3,5-bis(methylamino)cyclohexyloxy]-3-furoic acid which has been given the trivial name actinospectinoic acid.

Further, novel compounds of the invention are obtained upon reacting actinospectacin thiosemicarbazone with a loweralkylmercaptan and a strong mineral acid, for example, hydrogen chloride, hydrogen bromide, hydrogen iodide, sulfuric acid, phosphoric acid, and the like. For example, upon reacting actinospectacin thiosemicarbazone dihydrochloride with ethylmercaptan and cold concentrated hydrochloric acid there are obtained novel compounds designated as ethylthioactinospectacin thiosemicarbazone and bis-(ethylthio)anhydroactinospectose thiosemicarbazone. When the reaction is carried out for a short time, up to about 1 hour, the former product predominates; with a longer reaction time, however, the latter product predominates.

The term "loweralkyl" whenever used in the specification or claims refers to alkyl of one to eight carbon atoms, inclusive, e.g., methyl, ethyl, propyl, butyl, amyl, hexyl, heptyl, octyl, and the isomeric forms thereof.

The novel compound of the invention, 4-hydroxy-2-oxovaleraldehyde bis(thiosemicarbazone), exhibits characteristic absorption of light in the ultraviolet and visible regions, and accordingly, is useful in solutions or dispersed in plastic films as a light filter.

The novel compounds of the invention, actinospectacin thiosemicarbazone and loweralkylthioactinospectacin thiosemicarbazones, are useful as intermediates in making bis(loweralkylthio)anhydroactinospectose thiosemicarbazones which inhibit the development of the following microorganisms at a concentration of 1 mg./ml. tested in Eugon broth [Tryptocase (pancreatic digest of casein) 15 g./liter, Phytone (papaic digest of soya meal) 5 g./liter, L-cystine 0.7 g./liter, sodium chloride 4 g./liter, sodium sulphite 0.2 g./liter, dextrose 5.5 g./liter]:

*Aeromonas liquefaciens*
*Flavobacterium suaveolans*
*Erysipelothrix rhusiopathiae*
*Bacillus subtilis*
*Bacillus cereus*
*Staphylococcus aureus*
*Trigonopsis variabilis*
*Propionibacterium thoenii*

Thus, the novel bis-(loweralkylthio)anhydroactinospectose thiosemicarbazones are useful in controlling the infection of silkworms caused by pathogenic cultures of *B. subtilis*; they can also be used to minimize or prevent odor in fish and fish crates caused by this organism. Further, they can be used to decontaminate aquaria of the fish pathogen *Aeromonas liquefaciens* which causes infectious dropsy, or to treat fish affected by this organism. Also, these novel compounds can be used to inhibit the growth of the bacterium *Flavobacterium suaveolans* which is a common contaminant of the paper mill industry. Still further, the novel compounds can be used to inhibit the growth of *Erysipelothrix rhusiopathiae* which is a pathogen found in swine, sheep, turkeys, pigeons, and mice.

The following examples are illustrative of the process and products of the present invention, but are not to be construed as limiting.

EXAMPLE 1

*4-hydroxy-2-oxovaleraldehyde bis(thiosemicarbazone)*

To 50 g. of actinospectacin hydrochloride and 250 ml. of warm water was added 18.85 g. of thiosemicarbazide. Upon heating to 60 to 70° C., a yellow precipitate formed. After cooling, the mixture was filtered, yielding 3.7 g. of 4-hydroxy-2-oxovaleraldehyde bis(thiosemicarbazone) melting at 194–204° C. Two recrystallizations from acetone and water yielded 0.72 g. melting at 213–214° C.

*Elemental analysis.*—Calculated for $C_7H_{14}N_6S_2$: C, 32.05; H, 5.38; N, 32.04; S, 24.44. Found: C, 32.81; H, 4.31; N, 31.72; S, 24.57.

U.V. spectrum:

[(70 percent ethanol, 0.01 N KOH)]

| U.V. max.— | a |
|---|---|
| 240 (sh.) | 38.2 |
| 310 | 35.7 |
| 380 | 53 |

[(70 percent ethanol, 0.01 N $H_2SO_4$)]

| U.V. max.— | a |
|---|---|
| 243 | 39.4 |
| 258 | 39.1 |
| 299 | 47.7 |
| 268 | 60.9 |

EXAMPLE 2

*Actinospectacin thiosemicarbazone sulfate*

A solution of 1.3 g. of actinospectacin sulfate and 0.27 g. of thiosemicarbazide in a mixture of 50 ml. of ethanol and 70 ml. of water was refluxed for 4 hours. The solution was evaporated to dryness, and acetone was added to the residue to precipitate the acetone-insoluble material, after which the supernatant liquid was decanted. The remaining residue was crystallized from water-acetone to yield 0.77 g. of actinospectacin thiosemicarbazone sulfate having a melting point of 245° C. Recrystallization from water-acetone raised the melting point to 254–258° C.; pKa$_1$ of 7.0 and pKa$_2$ of 9.0.

*Elemental analysis.*—Calculated for $$C_{15}H_{27}N_5O_6S \cdot H_2SO_4$$

C, 35.79; H, 5.81; S, 12.74; N, 13.91. Found: C, 36.52; H, 5.54; C, 12.44; N, 13.73.

EXAMPLE 3

*Ethylthioactinospectacin thiosemicarbazone dihydrochloride*

To 5.4 g. of actinospectacin thiosemicarbazone dihydrochloride dissolved in 26 ml. of ice-chilled water was added 2.38 ml. of ethylmercaptan and 26 ml. of cold concentrated hydrochloric acid. The crystalline precipitate (2.66 g.), which appeared within ½ hour, was filtered and washed with acetone. After first recrystallizing from water and acetone, and then absolute ether, the ethylthioactinospectacin thiosemicarbazone dihydrochloride had a melting point of 215–225° C., and an optical rotation $[\alpha]_D^{25} = -133°$ (c., 1 percent in water).

*Elemental analysis.*—Calculated for $$C_{17}H_{31}N_5O_5S_2 \cdot 2HCl$$

C, 39.08; H, 6.37; Cl, 13.57; N, 13.40; O, 15.31; S, 12.27. Found: C, 39.33; H, 6.53; Cl, 13.57; S, 11.94.

EXAMPLE 4

*Bis-(ethylthio)anhydroactinospectose thiosemicarbazone*

To 18.9 g. of actinospectacin thiosemicarbazone dihydrochloride in 91 ml. of ice-chilled water was added 7.9 ml. of ethylmercaptan and 91 ml. of concentrated hydrochloric acid. The mixture was stirred while warming gradually to room temperature. After three days of agitation at room temperature, 8 g. of crystalline precipitate was removed, washed with water, then pentane, dried, and finally recrystallized from ethanol and water to yield 5.8 g. of bis-(ethylthio)anhydroactinospectose thiosemicarbazone. A second recrystallization from benzene and Skellysolve B (isomeric hexanes) gave a pale yellow to white product melting at 132–140° C. and having an optical rotation $[\alpha]_D^{25} = +17°$ in ethanol.

*Elemental analysis.*—Calculated for $C_{11}H_{19}N_3OS_3$: C, 43.25; H, 6.27; N, 13.76; S, 31.49. Found: C, 43.70, C, 43.04; H, 6.11, H, 6.32; N, 13.78, N, 13.71; S, 31.10, S, 31.70.

EXAMPLE 5

By substituting the ethylmercaptan of Example 3 by methyl-, propyl-, butyl-, pentyl-, hexyl-, heptyl-, and octylmercaptan there are obtained the corresponding methyl-, propyl-, butyl-, pentyl-, hexyl-, heptyl-, and octylthioactinospectacin thiosemicarbazone dihydrochloride.

EXAMPLE 6

By substituting the ethylmercaptan of Example 4 by methyl-, propyl-, butyl-, pentyl-, hexyl-, heptyl-, and octylmercaptan there are obtained the corresponding bis-(methylthio)-, bis-(propylthio)-, bis-(butylthio)-, bis-(pentylthio)-, bis(hexylthio)-, bis(heptylthio)-, and bis-(octylthio)anhydroactinospectose thiosemicarbazone.

We claim:

1. 4 - hydroxy-2-oxovaleraldehyde bis(thiosemicarbazone).

2. Actinospectacin thiosemicarbazone having in the form of its sulfate (a) a melting point of 254–258° C.;
   (b) a pKa$_1$ of 7.0 and a pKa$_2$ of 9.0; and
   (c) the following elemental analysis: C, 36.52; H, 5.54; S, 12.44; N, 13.73;

and being obtained by reacting actinospectacin with thiosemicarbazide.

3. Loweralkylthioactinospectacin thiosemicarbazone obtained by reacting actinospectacin thiosemicarbazone as characterized in claim 2 with a loweralkylmercaptan until one mole of loweralkylmercaptan has reacted for each mole of actinospectacin thiosemicarbazone, and isolating the loweralkylthioactinospectacin thiosemicarbazone so produced.

4. Ethylthioactinospectacin thiosemicarbazone obtained by reacting actinospectacin thiosemicarbazone as characterized in claim 2 with ethylmercaptan until one mole of ethylmercaptan has reacted for each mole of actinospectacin thiosemicarbazone, said ethylthioactinospectacin thiosemicarbazone having in the form of its dihydrochloride (a) a melting point of 215–225° C.;
   (b) an optical rotation $[\alpha]_D^{25} = -133°$ (c., 1% in water); and
   (c) the following elemental analysis: C, 39.33; H, 6.53; Cl, 13.57; S, 11.94.

5. Bis-(loweralkylthio)anhydroactinospectose thiosemicarbazone obtained by reacting actinospectacin thiosemicarbazone as characterized claim 2 with a loweralkylmercaptan until two moles of loweralkylmercaptan have reacted for each mole of actinospectacin thiosemicarbazone, and isolating the bis-(loweralkylthio)anhydroactinospectose thiosemicarbazone so produced.

6. Bis-(ethylthio)anhydroactinospectose thiosemicarbazone obtained by reacting actinospectacin thiosemicarbazone with ethylmercaptan until two moles of ethylmercaptan have reacted for each mole of actinospectacin thiosemicarbazide, said bis-(ethylthio)anhydroactinospectose thiosemicarbazone having (a) a melting point of 132–140° C.;
   (b) an optical rotation $[\alpha]_D^{25} = +17°$ in ethanol; and
   (c) the following elemental analysis: C, 43.70, 43.04; H, 6.11, 6.32; N, 13.78, 13.71; S, 31.10, 31.70;

and isolating the bis-(ethylthio)anhydroactinospectose thiosemicarbazone so produced.

7. A process which comprises reacting actinospectacin with thiosemicarbazide to produce 4-hydroxy-2-oxovaleraldehyde bis(thiosemicarbazone) and actinospectacin thiosemicarbazone as characterized in claim 2, and isolating the 4-hydroxy-2-oxovaleraldehyde bis(thiosemicarbazone) and actinospectacin thiosemicarbazone so produced.

8. A process which comprises reacting actinospectacin thiosemicarbazone as characterized in claim 2 with a loweralkylmercaptan in the presence of an acid until from one to two moles of loweralkylmercaptan has reacted for each mole of actinospectacin thiosemicarbazone, and isolating the loweralkylthioactinospectacin thiosemicarbazone produced.

9. A process which comprises reacting actinospectacin thiosemicarbazone as characterized in claim 2 with a loweralkylmercaptan in the presence of an acid for a time sufficient to produce predominantly bis(loweralkylthio)-anhydroactinospectose thiosemicarbazone by the reaction of two moles of loweralkylmercaptan for each mole of actinospectacin thiosemicarbazone and isolating the bis-(loweralkylthio)anhydroactinospectose thiosemicarbazone so produced.

References Cited by the Examiner

Charlesworth et al.: Can. J. Chem., vol. 34 (1956), pp. 376–82.

Sah et al.: Rec. Trav. Chim., vol. 69 (1950), pages 1545–56.

NICHOLAS S. RIZZO, *Primary Examiner.*